(12) United States Patent
Ekshtat-Schultz et al.

(10) Patent No.: US 10,191,994 B2
(45) Date of Patent: Jan. 29, 2019

(54) READING FROM A MULTITUDE OF WEB FEEDS

(71) Applicant: LinkedIn Corporation, Mountain View, CA (US)

(72) Inventors: Elizabeth Ekshtat-Schultz, Mountain View, CA (US); Axel R. Hansen, San Francisco, CA (US); Jonah L. Varon, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 686 days.

(21) Appl. No.: 14/589,842

(22) Filed: Jan. 5, 2015

(65) Prior Publication Data

US 2016/0094658 A1    Mar. 31, 2016

Related U.S. Application Data

(60) Provisional application No. 62/057,593, filed on Sep. 30, 2014.

(51) Int. Cl.
| | |
|---|---|
| *G06F 15/16* | (2006.01) |
| *G06F 17/30* | (2006.01) |
| *H04L 29/08* | (2006.01) |

(52) U.S. Cl.
CPC .......... *G06F 17/3089* (2013.01); *H04L 67/26* (2013.01)

(58) Field of Classification Search
None
See application file for complete search history.

(56) References Cited

U.S. PATENT DOCUMENTS

| | | | |
|---|---|---|---|
| 7,702,675 B1* | 4/2010 | Khosla | ............. G06F 17/30884 707/710 |
| 8,954,399 B1 | 2/2015 | Balakrishnan | |
| 9,002,858 B1 | 4/2015 | Dassa | |
| 9,395,979 B1* | 7/2016 | Bullukian | ................ G06F 8/71 |
| 2007/0124432 A1 | 5/2007 | Holtzman | |

(Continued)

OTHER PUBLICATIONS

"Dynamic polling times for news aggregators, II". LMOrchard Blog [online]. Sep. 29, 2003 [retrieved on Jun. 21, 2017]. Retrieved from the Internet: <URL: https://blog.lmorchard.com/2003/09/29/dynamicpollingfreqtoo/>.*

(Continued)

*Primary Examiner* — Sm A Rahman
*Assistant Examiner* — Dae Kim
(74) *Attorney, Agent, or Firm* — Park, Vaughan, Fleming & Dowler LLP

(57) ABSTRACT

A system, apparatus, and method are provided for retrieving new content from a multitude of web feeds (e.g., hundreds of thousands). Each of multiple sources hosts one or more web feeds (e.g., RSS feeds, Atom feeds), and is categorized based on how frequently new content is found in the source's feeds. Each source has a corresponding status indicator whose value increases (to a maximum value), each time the source's feeds are serviced (e.g., polled, downloaded) and new content is received, or decreases (to a minimum value) if no new content is received and the indicator has not been recently decreased. Each category of web feed source corresponds to a range of possible status indicator values, and a given source may dynamically move between categories as its status indicator value changes.

20 Claims, 3 Drawing Sheets

(56) References Cited

U.S. PATENT DOCUMENTS

| | | | |
|---|---|---|---|
| 2010/0057618 A1* | 3/2010 | Spicer | G06F 3/04815 705/64 |
| 2015/0220588 A1* | 8/2015 | Krauss | G06F 17/30424 707/692 |
| 2017/0086712 A1* | 3/2017 | Mauro | A61B 5/1127 |

OTHER PUBLICATIONS

"Feeds Documentation". Drupal Community Documentation [online], Sep. 8, 2013 [retrieved on Jun. 21, 2017]. Retrieved from the Internet: <URL: https://web.archive.org/web/20130908062047/https://www.drupal.org/documentation/modules/feeds>.*

Horincar et al. "Online refresh strategies for content based aggregation", World Wide Web, May 2, 2014 [retrieved on Jan. 8, 2018]. Retrieved from the Internet: <URL:https://link.springer.com/article/10.1007/s11280-014-0288-y>.*

"Now You're Going to Love Readkit", Sayzlim.net website, Sep. 14, 2013 [retrieved on Jun. 21, 2017]. Retrieved from the Internet: <https://sayzlim.net/love-readkit/>.*

Han et al.; "CASIANED: Web Personal Name Disambiguation Based on Professional Categorization", WWW 2009.

Mann et al.; "Unsupervised Personal Name Disambiguation", Assoc. Computational Linguistics Proc. 7th Conf. of Natural Lang. Learn., vol. 4, 2003.

Treeratpituk et al.; Disambiguating Authors in Academic Publications using Random Forests:, ACM Proc. Joint Conf. on Dig Library 2009, pp. 39-48.

PARR "LinkedIn Gives Users the Ability to Follow Companies", http://mashable.com/2010/04/29/linked-follow-company, published Apr. 29, 2010, accessed Mar. 29, 2017 via https://web-beta.archive.org/web/20100828014644/http://mashable.com/2010/04/29/linkedin-follow-company, 3 pages.

Wei et al. "Name Disambiguation in Person Information Mining", IEEE/WIC/ACM 2006 Int'l Conf. On Web Intel, 4 pages.

Jonnalagadda et al. "NEMO: Extraction and normalization of organization names of PubMed affiliation strings", J. Biomedical Discovery and Collaboration, 2010, vol. 5, pp. 50-75.

* cited by examiner

READING FROM A MULTITUDE OF WEB FEEDS

RELATED APPLICATION

This application claims priority under 35 U.S.C. § 119(e) to U.S. Provisional Patent Application Ser. No. 62/057,593, entitled "Reading from a Multitude of Web Feeds" and filed on Sep. 30, 2014, the contents of which are herein incorporated by reference.

BACKGROUND

This disclosure relates to the field of computer systems. More particularly, a system, apparatus, and methods are provided for reading from a multitude of web feeds that publish content at different rates and/or with different frequency.

Web feeds, such as RSS (Really Simple Syndication) feeds and Atom feeds, are mechanisms for publishing content to interested people (subscribers) without requiring them to visit the source of the feed (e.g., a web site, a blog) and manually access or retrieve the content. A source of electronic content, such as a newspaper, a magazine, a blog, or other publisher, may offer any number of web feeds, for different topics, different media, etc. A subscriber typically uses a feed aggregator, a feed reader, or other specialized software to retrieve and present the content, although a web browser may be able to be configured to provide this service.

Different sources and web feeds publish content at different rates or with different frequencies. As a consequence, if a subscriber checks a given feed on an irregular or infrequent basis, he or she may miss any number of content items published since the last time the feed was checked.

DETAILED DESCRIPTION

Figure 1:
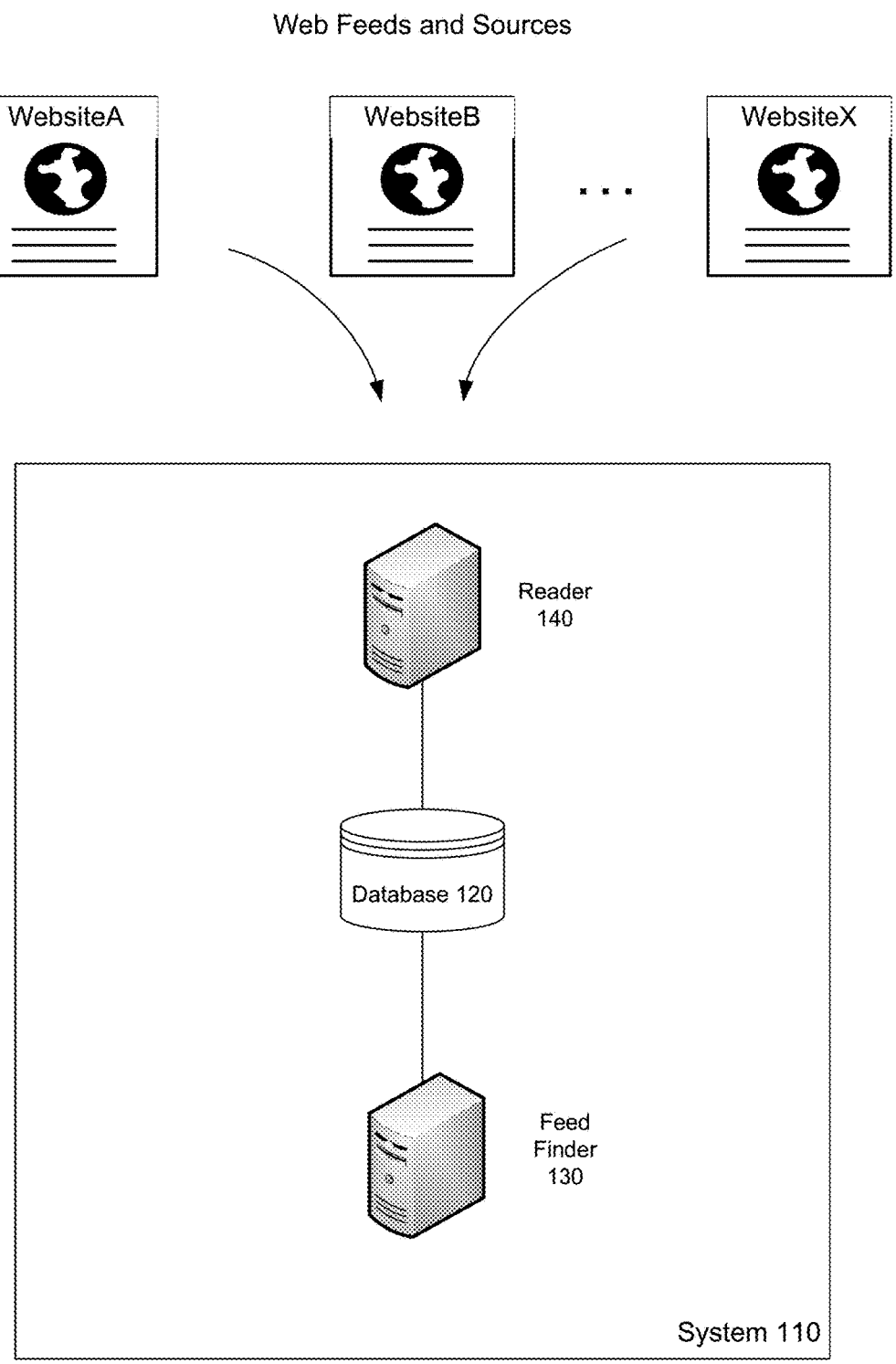
FIG. 1 is a block diagram depicting a system for reading from multiple web feeds that publish content at different rates or with different frequencies, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system, apparatus, and methods are provided for reading or retrieving content from many web feeds—such as hundreds of thousands of different feeds that publish content with different frequencies or at different rates. For example, some feeds may publish new content items at a relatively slow pace (e.g., on the order of days or weeks), others may publish new content items more frequently (e.g., on the order of minutes or hours), while others offer new content at other rates.

In these embodiments, feeds and/or the content sources that offer the feeds (e.g., newspapers, magazines, weblogs, other publishers) are dynamically categorized or classified based on the frequency or rate at which they publish new content. In different implementations, different numbers of categories or classes may be defined. Although some embodiments are described below as they may be implemented with just two categories, one of ordinary skill in the art will appreciate that other embodiments may include more.

In embodiments described below, each feed and/or each feed source has an associated counter or status indicator that may be updated or modified when the feed or source is polled or serviced. In these embodiments, polling a web feed or a web feed source involves checking for new content items, and possibly downloading new content if any is available. Illustratively, the indicator may be an integer value that is incremented if new content is found, or decremented if no new content is found, and may have a minimum value (e.g., approximately zero) and/or a maximum value (e.g., approximately 20).

In some implementations, a given indicator value is incremented every time the corresponding feed or source is polled and found to have new content, until the maximum value is reached. Conversely, when the corresponding feed or source is polled and found not to have new content available, the indicator value is decremented only if it has not been decremented within some threshold period of time (e.g., one hour, three hours, one day). Thus, a feed or source's indicator value may increase rapidly, but will decrease relatively slowly.

Each web feed and/or source of one or more feds is assigned to a category or class associated with the current value of its corresponding status indicator. For example, a first or "regular" category may include feeds that have indicator values in the range of 0 to 9, while a second or "fast" category may include feeds that have indicator values in the range of 10 to 20, assuming the overall range is 0 through 20 (inclusive). New sources or web feeds may be assigned an initial status indicator value near the middle of the range of values, such as 9 or 10.

Each category or class of source/feed has a corresponding frequency with which it will be checked for new content by a feed aggregator, feed reader, browser, or other software. A given feed or source may migrate from one class to another as its indicator value changes dynamically.

Because each feed will be polled or checked for new content with an appropriate frequency, a busy feed will be serviced sufficiently often to avoid missing any content items. Some feeds limit or cap the number of items available for downloading, and if a busy feed is not checked often enough, items may otherwise be missed. And, by checking slow feeds less often, the system or apparatus can avoid the unnecessary effort of polling a feed that has no new content.

FIG. 1 is a block diagram of a system for reading from a multitude of web feeds offered by different sources, according to some embodiments. In these embodiments, the system may or may not be incorporated within a professional social networking site or system, such as that offered by LinkedIn Corporation®.

In these embodiments, system 110 comprises database 120 in which identifiers, addresses, and/or other metadata are stored for hundreds of thousands of web feeds (e.g., approximately 250,000) and their associated sources (e.g., content publishers, producers, authors, portals). Thus, for each feed and source from which content is to be pulled, database 120 stores information that allows system 110 to connect to and communicate with the feed/source. Database 120 also stores status indicator values for each source.

Although embodiments addressed below are described as employing indicator values for each content source, wherein each source offers one or more web feeds, in other embodiments indicator values are assigned to each individual web feed instead of the feeds' sources. Further, in the following embodiments, some or all of a source's feeds are polled with the same frequency, based on the category or class of the source indicated by the source's status indicator value. In other embodiments, different feeds offered by a single source may be polled with different frequencies or regularities, according to the categories associated with their individual indicator values. As described previously, indicator values may be dynamic, so that a source's (or feed's) category, and corresponding polling frequency, may change from one polling operation to the next.

Feed finder 130 is a computer server or other computing device that periodically identifies new sources and/or web feeds to add to database 120. In one embodiment, a process executing on feed finder 130 crawls web sites, web pages, and/or other content locations to identify new feeds not already reflected in the database. In another embodiment, a process executing on feed finder 130 searches the Internet (e.g., via one or more search platforms or portals) for content of a particular type—such as content that mentions a particular name (of a person, of an organization), a place, a concept, key words, or some other information. Sites and systems identified through such a search may then be crawled to locate web feeds not previously known. In other embodiments, other methods of identifying new sources/feeds may be employed Reader 140 is a computer server or other computing device that polls sources identified in database 120 or, more particularly, web feeds offered by the identified sources and/or individually identified in the database. In the illustrated embodiments, reader 140 maintains separate queues for each category of content source (e.g., fast, regular, slow) and, when the sources/feeds are read from database 120, they are placed in the queue indicated by their category. Thus, feeds from one newspaper publisher (e.g., different feeds for each section of the periodical), weblog, social media site, or other sources are placed in the queue associated with the category to which the publisher, weblog, site, and other sources have been assigned.

The different queues are serviced with different frequencies. Thus, a "fast" queue may be serviced approximately every 5 or 10 minutes, while a "regular" queue may be serviced approximately every 30 or 60 minutes. Other queues may be serviced with other frequencies (e.g., every 2 hours, every 12 hours, every day). Each time a queue is serviced, the queue's feeds are polled and new content, if any, is downloaded. Each source's (or feed's) indicator value is subject to modification based on the polling of the source's feeds, as described previously.

Downloaded content may be used for various purposes, and made available to users of system 110 (or users of a system or site that includes system 110), for example. In some embodiments, downloaded content is processed to identify people, organizations, and/or other entities that are mentioned or named in the content. Successful identification of an entity may involve disambiguation between multiple entities that have the same name. U.S. patent application Ser. No. 14/565,158, entitled "Disambiguating Personal Names", and Ser. No. 14/565,165, entitled "Disambiguating Organization Names," both filed Dec. 9, 2014, describe methods of disambiguation and are incorporated herein by reference.

Functionality of system 110 may be distributed among its components in an alternative manner, such as by merging or further dividing functions of one or more components, or may be distributed among a different collection of components. Yet further, while depicted as separate and individual hardware components (e.g., computer servers) in FIG. 1, one or more of feed finder 130 and reader 140 may alternatively be implemented as separate software modules executing on one or more computer servers. Thus, although only a single instance of a particular component of system 110 may be illustrated in FIG. 1, it should be understood that multiple instances of some or all components may be utilized.

Figure 2:
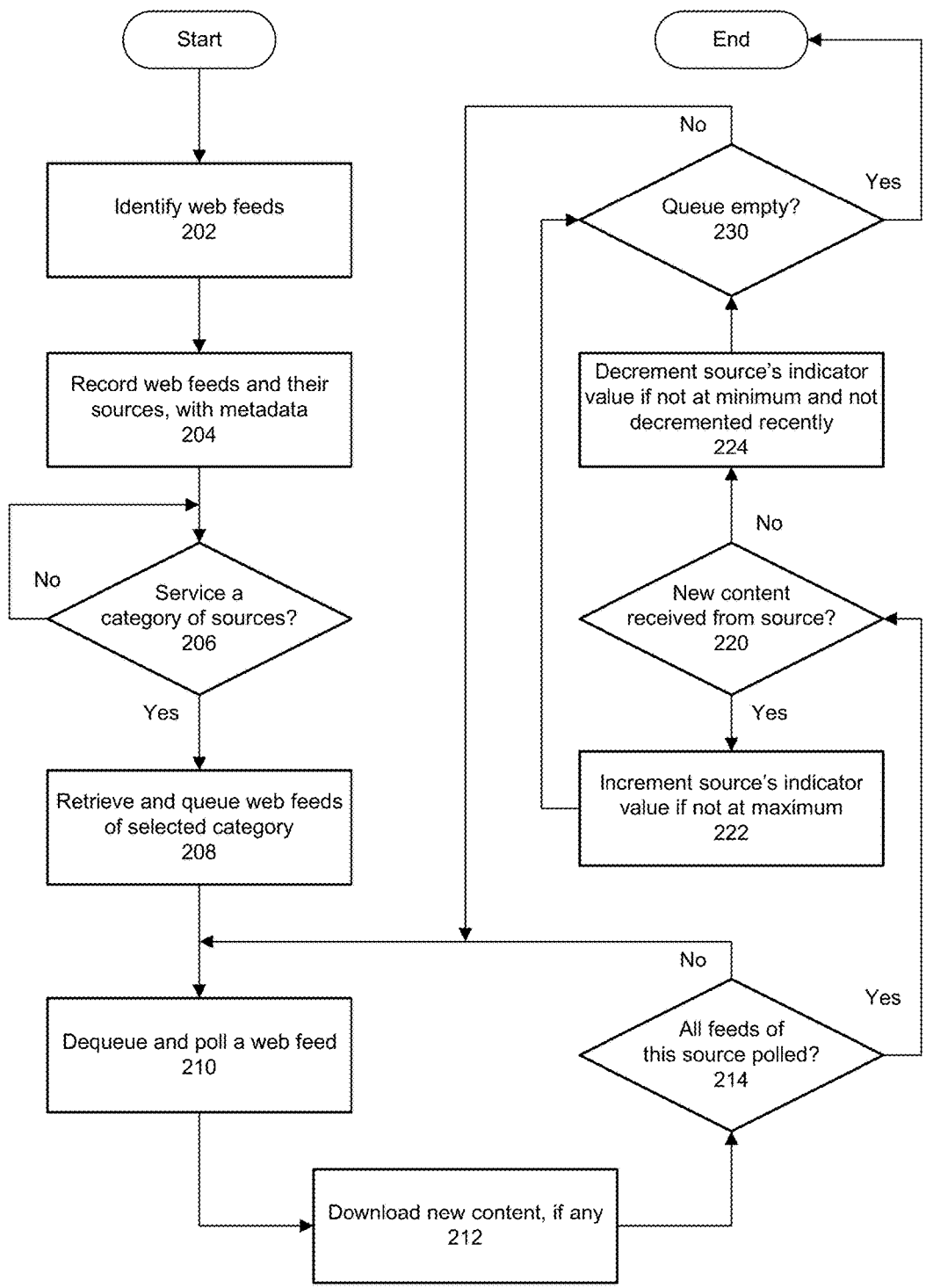
FIG. 2 is a flow chart illustrating a method of reading from multiple web feeds, in accordance with some embodiments.

FIG. 2 illustrates a method of reading from a multitude of web feeds offered by different sources, according to some embodiments. In other embodiments, the illustrated operations may be performed in a different order, may omit one or more illustrated operations, and/or may include an operation not depicted in FIG. 2.

In operation 202, multiple web feeds from different sources are identified. For example, and as indicated above, electronic sites may be crawled to locate feed links. In some implementations, some feeds may be ignored, depending on the nature of the content they provide, the type of content (e.g., audio, video), and/or other factors, in order to focus on content of a particular nature and/or type (e.g., informational and textual). In some implementations, operation 202 may be repeated at regular or irregular intervals (e.g., days, weeks, months) to attempt to identify additional sources and feeds.

In operation 204, the identified feeds and their sources (e.g., web sites, web pages, blogs) are recorded in a database or other repository. Data recorded for a source or feed may include an address (e.g., URL, IP address), days/times at which to avoid pulling content from the source or feed, a description, login or access credentials for accessing the source or feed, etc. As the method proceeds, additional information may be stored for corresponding sources and/or feeds, such as the date/time it was last polled, its status indicator value, its category (e.g., fast, regular, slow), etc.

In operation 206, the system or apparatus performing the method determines whether it is time to service a particular category of sources or web feeds. For example, in a two-category scenario, a 'fast' queue (a queue that receives feeds from sources determined to need fast or frequent servicing) may be serviced every 10 minutes while a 'regular' queue (a queue that receives feeds from sources determined to need regular or standard servicing) may be serviced approximately every 40 minutes.

In some embodiments, when system 110 is initialized or restarted, sources' feeds may be polled as soon as possible. Thereafter, timers may be used to determine the next time to poll the web feeds of sources in a particular category. Until a category of content sources is to be serviced, the system or apparatus may remain in operation 206 and/or perform some other processing (e.g., repeat operation 202, process content downloaded during a previous polling operation).

In operation 208, a particular category of sources is to be serviced. Therefore, feeds offered by the sources assigned to that category are read from the database and placed in the corresponding queue. For example, the database may be queried for sources assigned to the selected category and, for each such source, web feeds offered by the source may be retrieved and queued in the corresponding queue. Each web feed is illustratively queued with information that may be used to access the feed (e.g., address, login credentials if necessary).

In operation 210, a web feed is dequeued and the accompanying information is used to poll the feed. In some implementations, multiple worker processes or threads service each queue. In these implementations, each worker process or thread dequeues a batch of feeds (e.g., 10, 20, 30), polls and services them, then returns to handle more feeds if the queue is not empty.

For example, when a worker dequeues one feed of a particular source, it may also dequeue all other feeds offered by the same source (or a subset of all of a source's feeds if there are many). Thus, web feeds may be dequeued and polled according to their sources, and one source's feeds may be serviced (or at least dequeued for servicing) by a given worker before it services a feed of another source.

In operation 212, if the polled feed offers new content, that content is downloaded. In some embodiments, full content of new content items (e.g., news stories, articles, blog entries) is downloaded (e.g., not just titles or summaries), although the information that is downloaded in other embodiments may vary.

However, in some implementations of the illustrated embodiments, when a web feed is polled it may be polled just to receive some initial information such as the titles of content items currently offered, content source, dates (e.g., dates/times of publication of the items, date/time of the poll operation), URLs (Uniform Resource Locators) of the items, bylines, authors, etc. In other implementations of these embodiments, entire items are retrieved and the initial information extracted. Either way, in these embodiments the system or apparatus can quickly determine which of the offered items, if any, are new (i.e., were not previously downloaded from this feed, or maybe from all feeds).

To assist in identifying new content items, some or all of the information indicated above may be cached (e.g., URL, title, date/time, source) for downloaded content items. In a subsequent polling operation, when this information is received for the content items now being offered, the system or apparatus may skip (i.e., not download) any or all available items that (a) match a cached item or (b) have a date (e.g., publication date/time in the feed) that is (1) older than a threshold time period (e.g., 1 hour, one day), which may depend on the category associated with the feed's source, and/or (2) earlier than the last time the current feed was polled.

In some alternative embodiments, content offered by a feed may be downloaded every time the feed is polled, without checking whether any items are duplicates or have already been retrieved. Subsequently, the system or apparatus (or some other entity) may discard any items that duplicate what was previously obtained. However, this would mean that updating a source's (or feed's) status indicator would be done offline and thus a given source's change from one category to another may be delayed.

In operation 214, the system or apparatus determines whether all of the current source's web feeds have been polled. If not, the method returns to operation 210 to dequeue and poll another feed from the same source. If all of the source's web feeds have been polled, the method advances to operation 220.

In operation 220, it is determined whether new content was received from any of the source's feeds. If so, the method continues at operation 222; otherwise, the method advances to operation 224.

In operation 222, the current source's status indicator value is incremented (e.g., by 1) if it is not already at the maximum (if a maximum exists). The source's updated value is recorded (e.g., in the collection of feeds/sources) and, if the incremented value means the current source now belongs to a different category, the source's (and/or the source's feeds') new category is also recorded in the database or repository of source/feed information. The method then advances to operation 230.

In operation 224, no new content was received from any of the current source's feeds; therefore, its status indicator value may be decremented (e.g., by 1). However, in these embodiments, the value only decreases if it is not already at a minimum value (if a minimum exists) and if it was not recently decremented. A given status indicator value may be deemed to have been recently decremented if it was decremented within a predetermined period of time (e.g., 15 minutes, 1 hour), which may depend upon the source's category, or within some number of polling operations (e.g., 2, 4).

If the source's status indicator value is decremented, its new value (and new category, if applicable) is stored. After operation 224, the method advances to operation 230.

In operation 230, the system or apparatus determines whether the queue for the category currently being polled is empty. If so, the method ends. Otherwise, the method returns to operation 210 to service a web feed of another source.

In some embodiments, instead of ending after the current category's queue is empty, the method may return to operation 206 to await a next service cycle. Some or all service cycles for a given category may repeat operations 208 through 230, including retrieving the sources/feeds from the database or repository in which they are recorded. By doing so, feeds/sources added to the collection will be serviced in the very next cycle. Alternatively, after each source's web feeds are polled, they may be re-queued (in the same or different queue) to await the next service cycle, and new feeds may be queued at any time.

Figure 3:
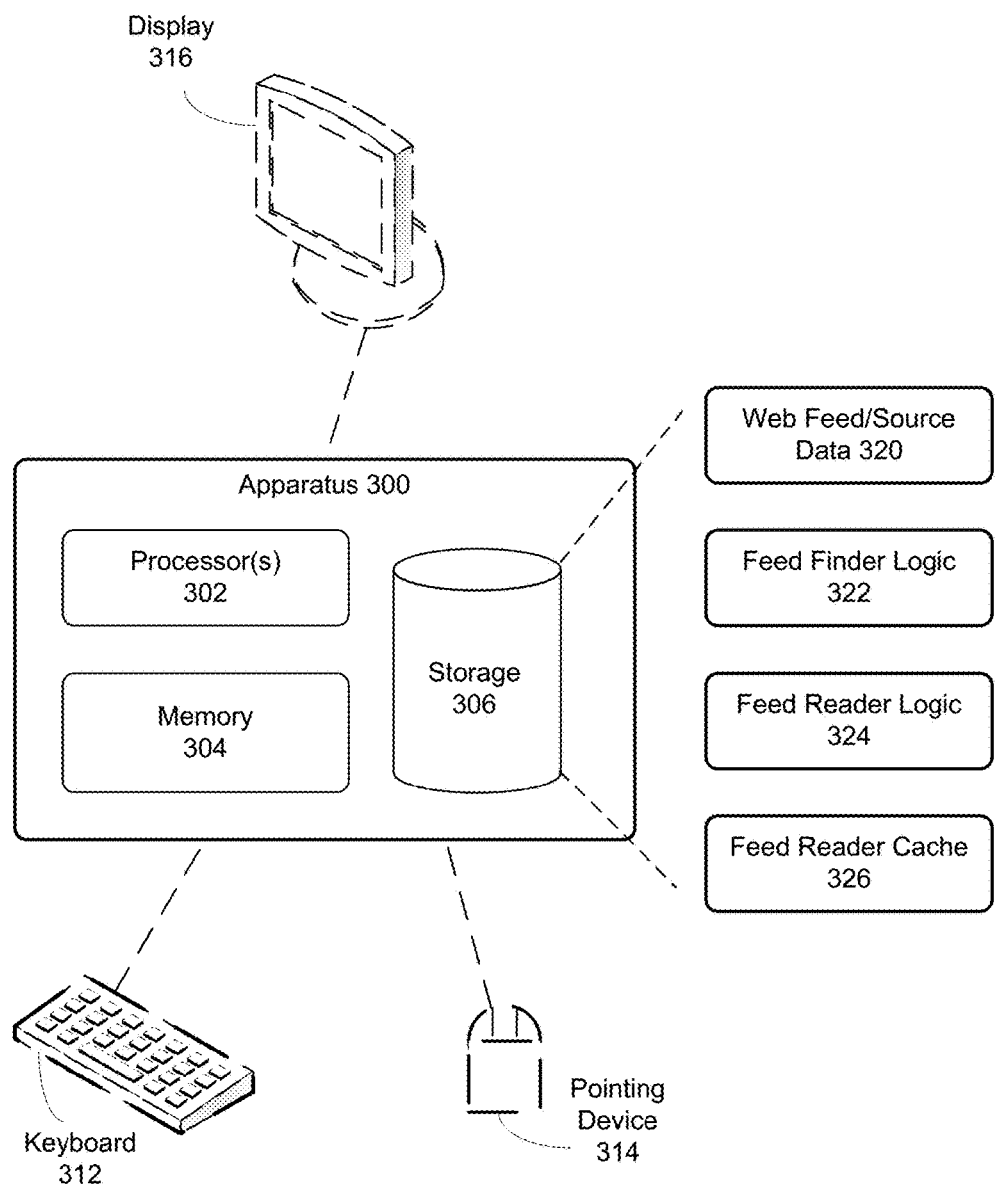
FIG. 3 depicts an apparatus for reading from web feeds, in accordance with some embodiments.

FIG. 3 is a block diagram of an apparatus for reading a multitude of web feeds offered by different sources, according to some embodiments.

Apparatus 300 of FIG. 3 includes processor(s) 302, memory 304, and storage 306, which may comprise one or more optical, solid-state, and/or magnetic storage components. Storage 306 may be local to or remote from the apparatus. Apparatus 300 can be coupled (permanently or temporarily) to keyboard 312, pointing device 314, and display 316.

Multiple apparatuses 300 may cooperate to identify web feeds (and sources of web feeds), poll the feeds, retrieve new content, eliminate duplicate content items, and/or perform other processing (e.g., to make downloaded content available to users).

Storage 306 stores data 320 regarding web feeds that are polled and/or the sources that offer the feeds, such as addresses, titles, descriptions, corresponding status indicators and/or assigned categories, the last time a web feed or source was polled, etc.

Storage 306 also stores logic that may be loaded into memory 304 for execution by processor(s) 302. Such logic includes feed finder logic 322 and feed reader logic 324. In other embodiments, these logic modules may be combined or divided to aggregate or separate their functionality as desired.

Feed finder logic 322 comprises processor-executable instructions for identifying new sources of web feeds and new feeds offered by existing sources, which may involve crawling some electronic systems or networks; parsing web pages, blogs, and/or other data sources; and updating web feed/source data 320 accordingly. Each new web feed source (or individual feed) may be assigned a status indicator value close to the median or to the average of the maximum and minimum possible values, and/or be assigned to the category of source that is serviced most frequently. As indicated above, if the source does not publish new content with sufficient frequency to remain in this category, its status indicator value will decrease and it will be re-categorized.

Feed reader logic 324 comprises processor-executable instructions for retrieving content from web feeds and for updating sources' (and/or web feeds') status indicator values and categories appropriately. Each category has one or more associated queues and a corresponding frequency with which the sources/feeds in that category are serviced/polled. Sources that publish new content frequently will be promoted to the most-frequently serviced category, while those that do not will be placed in categories (or a category) better suited to their level of activity.

Storage 306 also stores feed reader cache 326 to help identify and avoid downloading or retaining duplicate content. Illustratively, for each content item retrieved and retained/processed by apparatus 300 and/or associated computing equipment, information such as title, identifier (e.g., URL), web feed, source, date/time retrieved or published, and so on, is stored in cache data 326. Items subsequently offered by a web feed may be compared to the cache to determine whether those items appear to be new or appear to be the same as (or duplicates of) what has been cached.

In some embodiments, apparatus 300 performs some or all of the functions ascribed to one or more components of system 110 of FIG. 1, such as database 120, feed finder 130, and reader 140.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A computer-implemented method of retrieving content published in multiple web feeds offered by multiple sources, the method comprising:
   identifying web feeds offered by the multiple sources; and
   operating the computer to, for each of the multiple sources:
     poll the web feeds offered by the source to determine whether any polled web feed has new content;
     retrieve the new content from each of the web feeds that has new content;
     when new content is retrieved from at least one web feed offered by the source during the poll, increment a content indicator value corresponding to the source if the content indicator value is not currently a maximum value, wherein:
       said increment consists of a single increment of the content indicator value regardless of the number of content items retrieved; and
       the content indicator value indicates a relative frequency with which new content is retrieved from the source;
     when no new content is retrieved from any web feed offered by the source during the poll, decrement the content indicator value if:
       the content indicator value is not currently a minimum value; and
       the content indicator value has not been decremented within a threshold period of time; and
     schedule the source for a next polling.

2. The method of claim 1, further comprising:
   identifying a new source offering at least one web feed;
   adding the new source to a database that stores identifiers of all identified sources; and
   initializing a content indicator value corresponding to the new source to an initial value equal to an average of the minimum value and the maximum value.

3. The method of claim 1, further comprising operating the computer to, for each of the multiple sources:
   categorize the source into one of multiple categories based on the corresponding content indicator;
   wherein each of the multiple categories corresponds to a different sub-range of possible values of the content indicator.

4. The method of claim 3, wherein the threshold period of time depends on the category of the source.

5. The method of claim 3, wherein scheduling a source comprises adding the source to the queue corresponding to the web feed's category.

6. The method of claim 3, wherein:
   for each of the multiple categories, a separate queue is maintained for queuing sources in the category for polling; and
   each of the queues is serviced with a different frequency.

7. The method of claim 6, wherein:
every source in a first queue is polled every five minutes; and
every source in a second queue is polled every hour.

8. The method of claim 1, wherein different sources comprise different quantities of web feeds.

9. A system for retrieving content published in multiple web feeds offered by multiple sources, comprising:
a data repository storing information for accessing multiple sources and, for each of the multiple sources, one or more web feeds;
a feed finder module comprising a first non-transitory computer-readable medium storing instructions that, when executed, cause the system to:
identify web feeds offered by the multiple sources; and
a feed reader module comprising a second non-transitory computer-readable medium storing instructions that, when executed, cause the system to, for each of the multiple sources:
poll the web feeds offered by the source to determine whether any polled web feed has new content;
retrieve the new content from each of the web feeds that has new content;
when new content is retrieved from at least one web feed offered by the source during the poll, increment a content indicator value corresponding to the source if the content indicator value is not currently a maximum value, wherein:
said increment consists of a single increment of the content indicator value regardless of the number of content items retrieved; and
the content indicator value indicates a relative frequency with which new content is retrieved from the source;
when no new content is retrieved from any web feed offered by the source during the poll, decrement the content indicator value if:
the content indicator value is not currently a minimum value; and
the content indicator value has not been decremented within a threshold period of time; and
schedule the source for a next polling.

10. The system of claim 9, the first non-transitory computer-readable medium further storing instructions that, when executed, cause the system to:
identify a new source offering at least one web feed;
add the new source to a database that stores identifiers of all identified sources; and
initialize a content indicator value corresponding to the new source to an initial value equal to an average of the minimum value and the maximum value.

11. The system of claim 9, further comprising a non-transitory computer-readable medium storing instructions that, when executed, cause the system to, for each of the multiple sources:
categorize the source into one of multiple categories based on the corresponding content indicator;
wherein each of the multiple categories corresponds to a different sub-range of possible values of the content indicator.

12. The system of claim 11, wherein the threshold period of time depends on the category of the source.

13. The system of claim 11, wherein scheduling a source comprises adding the source to the queue corresponding to the web feed's category.

14. The system of claim 11, wherein:
for each of the multiple categories, a separate queue is maintained for queuing sources in the category for polling; and
each of the queues is serviced with a different frequency.

15. An apparatus for retrieving content published in multiple web feeds offered by multiple sources, comprising:
one or more processors; and
a non-transitory computer-readable medium storing instructions that, when executed by the one or more processors, cause the apparatus to:
identify web feeds offered by the multiple sources; and
for each of the multiple sources:
poll the web feeds offered by the source to determine whether any polled web feed has new content;
retrieve the new content from each of the web feeds that has new content;
when new content is retrieved from at least one web feed offered by the source during the poll, increment a content indicator value corresponding to the source if the content indicator value is not currently a maximum value, wherein:
said increment consists of a single increment of the content indicator value regardless of the number of content items retrieved; and
the content indicator value indicates a relative frequency with which new content is retrieved from the source;
when no new content is retrieved from any web feed offered by the source during the poll, decrement the content indicator value if:
the content indicator value is not currently a minimum value; and
the content indicator value has not been decremented within a threshold period of time; and
schedule the source for a next polling.

16. The apparatus of claim 15, the non-transitory computer-readable medium further comprising instructions that, when executed by the one or more processors, cause the apparatus to:
identify a new source offering at least one web feed;
add the new source to a database that stores identifiers of all identified sources; and
initialize a content indicator value corresponding to the new source to an initial value equal to an average of the minimum value and the maximum value.

17. The apparatus of claim 15, the non-transitory computer-readable medium further comprising instructions that, when executed by the one or more processors, cause the apparatus to, for each of the multiple sources:
categorize the source into one of multiple categories based on the corresponding content indicator;
wherein each of the multiple categories corresponds to a different sub-range of possible values of the content indicator.

18. The apparatus of claim 17, wherein the threshold period of time depends on the category of the source.

19. The apparatus of claim 17, wherein scheduling a source comprises adding the source to the queue corresponding to the web feed's category.

20. The apparatus of claim 17, wherein:
for each of the multiple categories, a separate queue is maintained for queuing sources in the category for polling; and
each of the queues is serviced with a different frequency.

* * * * *